United States Patent
Son

(10) Patent No.: US 8,743,314 B2
(45) Date of Patent: Jun. 3, 2014

(54) REFLECTING PLATE FOR PREVENTING LEAKAGE OF LIGHT, BACKLIGHT AND LIQUID CRYSTAL DISPLAY DEVICE HAVING THE SAME

(75) Inventor: Young-Uk Son, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 378 days.

(21) Appl. No.: 12/971,484

(22) Filed: Dec. 17, 2010

(65) Prior Publication Data

US 2011/0149204 A1 Jun. 23, 2011

(30) Foreign Application Priority Data

Dec. 18, 2009 (KR) .......... 10-2009-0127438

(51) Int. Cl.
*G02F 1/1335* (2006.01)
(52) U.S. Cl.
USPC ............... 349/62; 349/65; 362/609; 362/612; 362/623

(58) Field of Classification Search
USPC .............................. 349/65, 67; 362/97.1–97.3
See application file for complete search history.

(56) References Cited

U.S. PATENT DOCUMENTS

| | | | |
|---|---|---|---|
| 7,172,327 B2 | 2/2007 | Kuo | |
| 2003/0218702 A1 | 11/2003 | Kwon et al. | |
| 2006/0098458 A1 | 5/2006 | Mikami | |
| 2007/0221943 A1* | 9/2007 | Moriya et al. | 257/99 |
| 2008/0088764 A1* | 4/2008 | Son et al. | 349/58 |
| 2011/0025942 A1* | 2/2011 | Lee | 349/58 |
| 2012/0086889 A1* | 4/2012 | Chang et al. | 349/65 |

FOREIGN PATENT DOCUMENTS

| | | |
|---|---|---|
| JP | 2001-184924 A | 7/2001 |
| JP | 2004-235139 A | 8/2004 |
| JP | 2005-134554 A | 5/2005 |
| JP | 2008-034125 A | 2/2008 |
| KR | 10-2003-0091147 A | 12/2003 |

OTHER PUBLICATIONS

KIPO—Office Action for Korean Patent Application No. 10-2009-0127438—Issued on Feb. 26, 2013.
Office Action and English translation dated Dec. 5, 2012 issued by the State Intellectual Property Office of China in corresponding Chinese Patent Application No. 201010506414.3.

* cited by examiner

*Primary Examiner* — Richard Kim
(74) *Attorney, Agent, or Firm* — Morgan, Lewis & Bockius LLP

(57) ABSTRACT

Disclosed are a reflecting plate capable of preventing inferiority of an image quality due to leakage of light emitted from LEDs to outside, a backlight and an LCD device having the same. An extension portion extending towards an LED substrate is formed on a side surface of the reflecting plate, the side surface where the LEDs are arranged. This may shield light emitted from the LEDs and leaked to a space between the LED substrate and the reflecting plate.

9 Claims, 5 Drawing Sheets

REFLECTING PLATE FOR PREVENTING LEAKAGE OF LIGHT, BACKLIGHT AND LIQUID CRYSTAL DISPLAY DEVICE HAVING THE SAME

BACKGROUND OF THE INVENTION

1. Field of the Invention

The present invention relates to a reflecting plate, and particularly, to a reflecting plate capable of preventing light from leaking to outside, a backlight and a liquid crystal display (LCD) device having the same.

2. Background of the Invention

Recently, with the development of various portable electronic devices, such as mobile phones, PDAs, notebook computers, etc., a light, thin, small flat panel display device has been in great demand. Research and development are actively conducted for the flat panel display devices, such as an LCD, a PDP (Plasma Display Panel), an FED (Field Emission Display), a VFD (Vacuum Fluorescent Display), etc. Among these devices, the LCD attracts much more attention because of its simple mass-production technique, easy driving system, and implementation of a high picture quality.

The LCD device is a transmissive type display device, and displays a desired image on a screen by controlling an amount of light passing through a liquid crystal layer by a refraction anisotropy of a liquid crystal molecule. Accordingly, the LCD device is provided with a backlight, an optical source passing through a liquid crystal layer for an image display. The backlight is generally divided into an edge type backlight that a lamp is installed on a side surface of a liquid crystal panel thus to provide light to a liquid crystal layer, and a direct type backlight that a lamp is installed below a liquid crystal panel thus to directly provide light to a liquid crystal layer.

According to the edge type backlight, a lamp is installed on a side surface of a liquid crystal panel thus to provide light to a liquid crystal layer through a reflecting plate and a light guide panel. Accordingly, the edge type backlight has a thin thickness thereby to be mainly applied to a notebook, etc. However, the edge type backlight has a difficulty in being applied to an LC panel having a large area since a lamp is installed on a side surface of an LC panel. Furthermore, since light is supplied through the light guide panel, it is difficult to obtain high brightness. Accordingly, the edge type backlight is not suitable for an LC panel for an LCD TV having a large area, one of the most spotlighted LC panel.

According to the direct type backlight, light emitted from a lamp is directly supplied to a liquid crystal layer. Accordingly, the direct type backlight can be applied to a liquid crystal panel of a large area, and a high brightness can be implemented. Therefore, the direct type backlight is mainly used to fabricate a liquid crystal panel for an LCD TV.

As an optical source of the backlight, a Light Emitting Device (LED) which spontaneously emits light, rather than fluorescent lamps, is being used. The LED is an optical source which spontaneously emits monochromatic light such as R, G and B. Accordingly, when being applied to the backlight, the LED implements an excellent color reproduction rate, and reduces driving power.

FIG. 1 is a view showing a structure of an LCD device having a backlight provided with an LED in accordance with the related art, and FIG. 2 is a sectional view of an LCD device in which a backlight and an LC panel are assembled to each other.

As shown in FIGS. 1 and 2, the related LCD device comprises an LC panel 10 composed of a first substrate 1, a second substrate 2, and an LC layer (not shown) disposed therebetween, for implementing an image as a signal is applied thereto from outside; a light emitting device (LED) substrate 32 disposed at a lower side surface of the LC panel 10 and having a plurality of LEDs 34 for emitting light; a light guide panel 35 disposed below the LC panel 10, for guiding light emitted from the LEDs 34 to the LC panel 10; an optical sheet 38 disposed between the LC panel 10 and the light guide panel 35, and consisting of a diffusion sheet 38a and prism sheets 38b, 38c for diffusing and collecting light supplied from the light guide panel 35 to the LC panel 10; a reflecting plate 36 disposed below the light guide panel 35, for reflecting incident light to the LC panel 10; a bottom cover 40 for accommodating therein the reflecting plate 36, the light guide panel 35, the optical sheet 38, and the LED substrate 32; a guide panel 42 having the LC panel 10 therein, for assembling the reflecting plate 36, the light guide panel 35, the optical sheet 38, and the LED substrate 32 with one another by being coupled to the bottom cover 40; and an top cover 46 coupled to the guide panel 42, for assembling the LC panel 10.

The bottom cover 40 serves to assemble a backlight consisting of the reflecting plate 36, the light guide panel 35, the optical sheet 38, the LEDs 34, and has a wall surface upwardly extending from a bottom surface. As components of the backlight are disposed inside the wall surface, the backlight is assembled. The top cover 46 is assembled with the guide panel 42 and the bottom cover 40, thereby assembling the LC panel 10 and the backlight with each other.

In case of using a fluorescent lamp as an optical source, light emitted from the fluorescent lamp may leak to other components rather than the light guide panel 35. In order to prevent this, a lamp housing formed of a metallic material was conventionally disposed on a side surface of the light guide panel, and the fluorescent lamp was disposed in the lamp housing. However, in case of using the LEDs 34 as an optical source, the reflecting plate 36 was used instead of the expensive lamp housing.

More concretely, as shown in FIGS. 1 and 2, the reflecting plate 36 is upwardly extending towards a bottom surface and four side surfaces of the light guide panel 35, thereby facing the four side surfaces of the light guide panel 35. Especially, an extension portion 36b is extendingly formed at the end of the reflecting plate 36 where the LED substrate 32 is disposed, thereby partially covering an upper surface of the light guide panel 35.

The LED substrate 32 is disposed on a rear surface of the reflecting plate 36. Accordingly, a front surface of the LED substrate 32, i.e., a surface where the LEDs 34 are mounted is positioned on the rear surface of the reflecting plate 36. Here, a plurality of windows 36a are formed on the reflecting plate 36 facing the light guide panel 35 and having the LED substrate 32 thereon. Since the windows 36a are aligned with the LEDs 34 of the LED substrate 32, the LEDs 34 faces a side surface of the light guide panel 35 through the windows 36a. That is, the reflecting plate 36 is positioned on a front surface of the LED substrate 32, and only the LEDs 34 are protruding to the reflecting plate 36 through the windows 36a thus to face the light guide panel 35. And, the extension portion 36b is disposed to partially cover an upper surface of the light guide panel 35. Since the bottom surface, part of the upper surface and the four side surfaces (except for the part facing the windows) of the light guide panel 35 are encompassed by the reflecting plate 36, the reflecting plate 36 serves as the lamp housing. This may prevent light emitted from the LEDs 34 from leaking to outside.

However, this LCD device has the following problems.

The windows 36a which encompass the LEDs 34 has a gap between the windows 36a and the LEDs 34. Accordingly, light emitted from the LEDs 34 leaks to outside through the windows 36a, and thus inferiority of an image quality occurs on a screen.

SUMMARY OF THE INVENTION

Therefore, an object of the present invention is to provide a reflecting plate capable of preventing light emitted from LEDs from leaking to a space between an LED substrate and the reflecting plate, by forming an extension portion which extends towards the LED substrate on a side surface of the reflecting plate, said side surface where the LEDs are arranged.

Another object of the present invention is to provide a backlight and a liquid crystal display (LCD) device having the reflecting plate.

To achieve these and other advantages and in accordance with the purpose of the present invention, as embodied and broadly described herein, there is provided a reflecting plate, comprising: a body disposed below a light guide panel, for reflecting light emitted from the light guide panel; side surfaces upwardly extending from four edges of the body; a plurality of windows formed on at least one of the side surfaces where LEDs are arranged; and a first extension portion disposed on an upper end of the side surface where the LEDs are arranged, and extending towards an opposite side to the light guide panel, for reflecting light leaked to outside.

The reflecting plate may further comprise a second extension portion extending towards the light guide panel from the upper end of the side surface where the LEDs are arranged, and positioned on an upper surface of the light guide panel.

The first extension portion may be formed above the windows formed on the side surface, and may be formed by upwardly bending the side surface to be cut so as to form the windows.

To achieve these and other advantages and in accordance with the purpose of the present invention, as embodied and broadly described herein, there is also provided a backlight, comprising: a light emitting device (LED) substrate having a plurality of LEDs mounted thereon, the LEDs for supplying light to a liquid crystal (LC) panel; a light guide panel for guiding light emitted from the LEDs to the LC panel; and a reflecting plate disposed on a bottom surface or side surfaces of the light guide panel, for reflecting light outputted from the light guide panel, wherein the reflecting plate comprises: a body disposed below the light guide panel, for reflecting light emitted from the light guide panel; side surfaces upwardly extending from four edges of the body; a plurality of windows formed on at least one of the side surfaces where LEDs are arranged; and a first extension portion disposed on an upper end of the side surface where the LEDs are arranged, and extending towards an opposite side to the light guide panel, for reflecting light leaked to outside.

To achieve these and other advantages and in accordance with the purpose of the present invention, as embodied and broadly described herein, there is still also provided a liquid crystal display (LCD) device, comprising: an LC panel; a light emitting device (LED) substrate formed on one or more sides below the LC panel, and having a plurality of LEDs mounted thereon, the LEDs for supplying light to the LC panel; a light guide panel for guiding light emitted from the LEDs to the LC panel; and a reflecting plate disposed on a bottom surface or side surfaces of the light guide panel, for reflecting light outputted from the light guide panel, wherein the reflecting plate comprises: a body disposed below the light guide panel, for reflecting light emitted from the light guide panel; side surfaces upwardly extending from four edges of the body; a plurality of windows formed on at least one of the side surfaces where LEDs are arranged; and a first extension portion disposed on an upper end of the side surface where the LEDs are arranged, and extending towards an opposite side to the light guide panel, for reflecting light leaked to outside.

In the present invention, the extension portion extending towards the LED substrate may be formed on the side surface of the reflecting plate where the LEDs are arranged. This may reflect light emitted from the LEDs and leaking to a space between the LED substrate and the reflecting plate. Accordingly, lowering of a picture quality may be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

Hereinafter, a reflecting plate, a backlight and an LCD device having the same will be explained in more detail with reference to the attached drawings.

Figure 1:
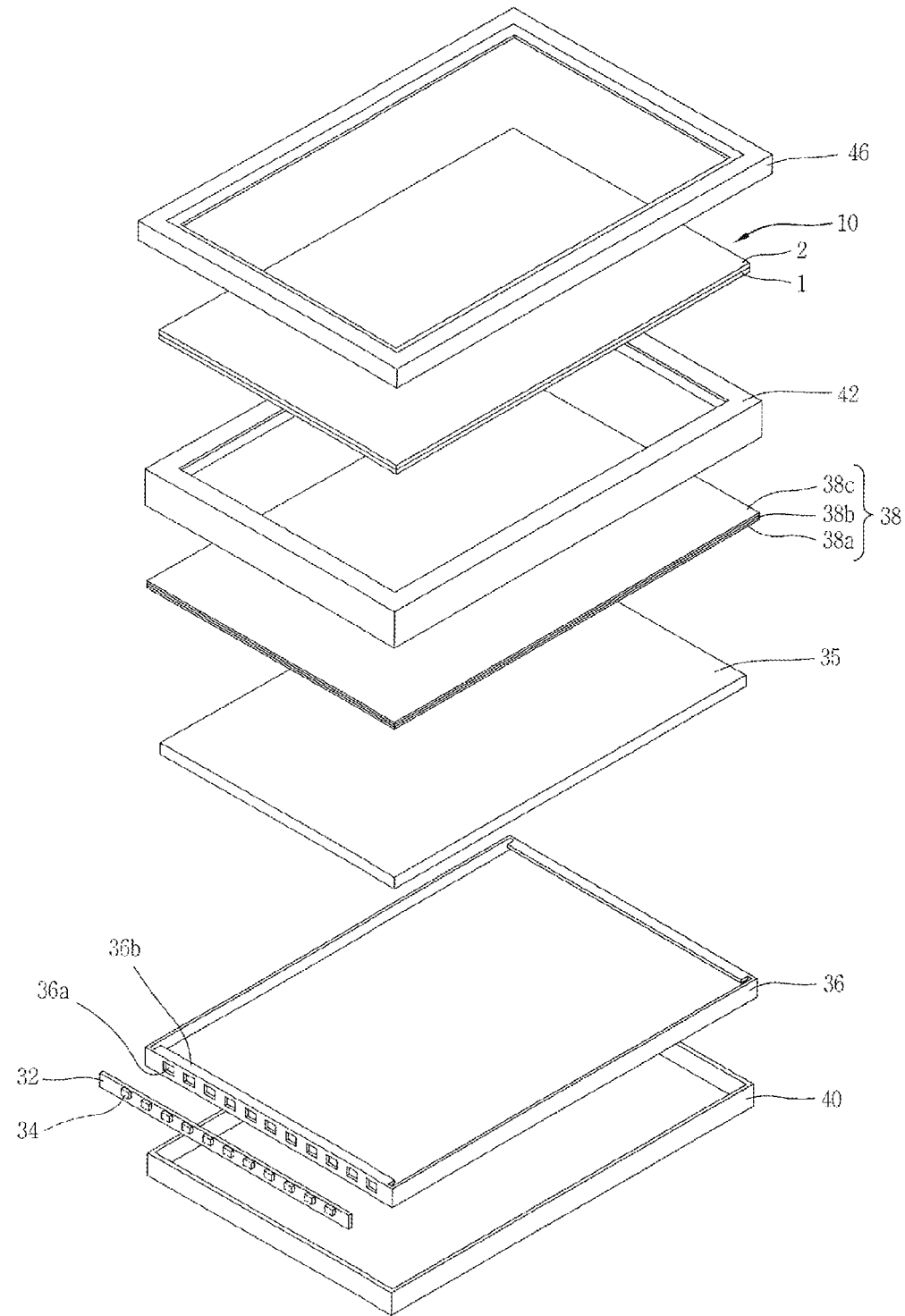
FIG. 1 is a disassembled perspective view showing a structure of a liquid crystal display (LCD) device in accordance with the related art.
Figure 2:
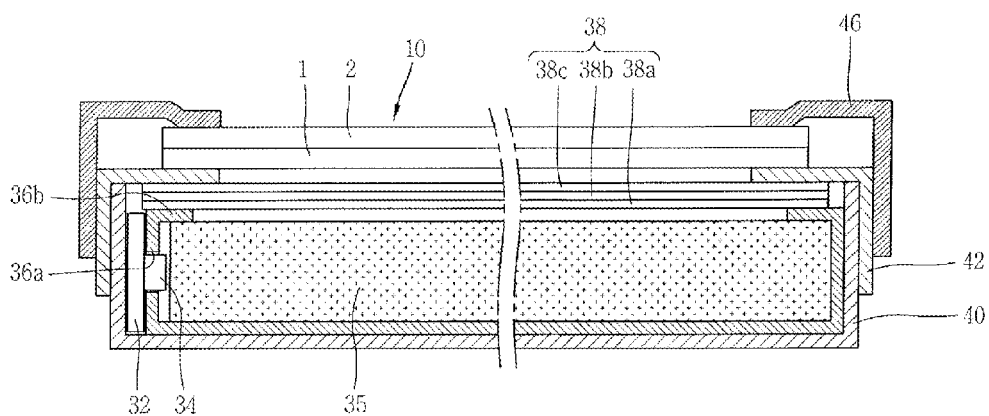
FIG. 2 is a sectional view showing the LCD device in accordance with the related art.
Figure 3:
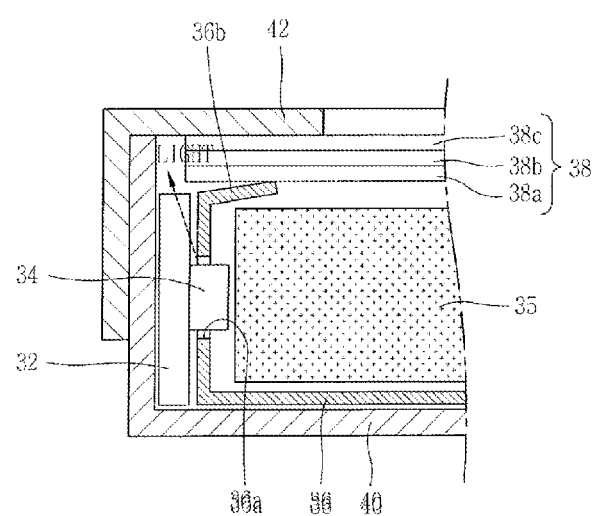
FIG. 3 is a partial enlargement sectional view of the LCD device in accordance with the related art.
Figure 4:
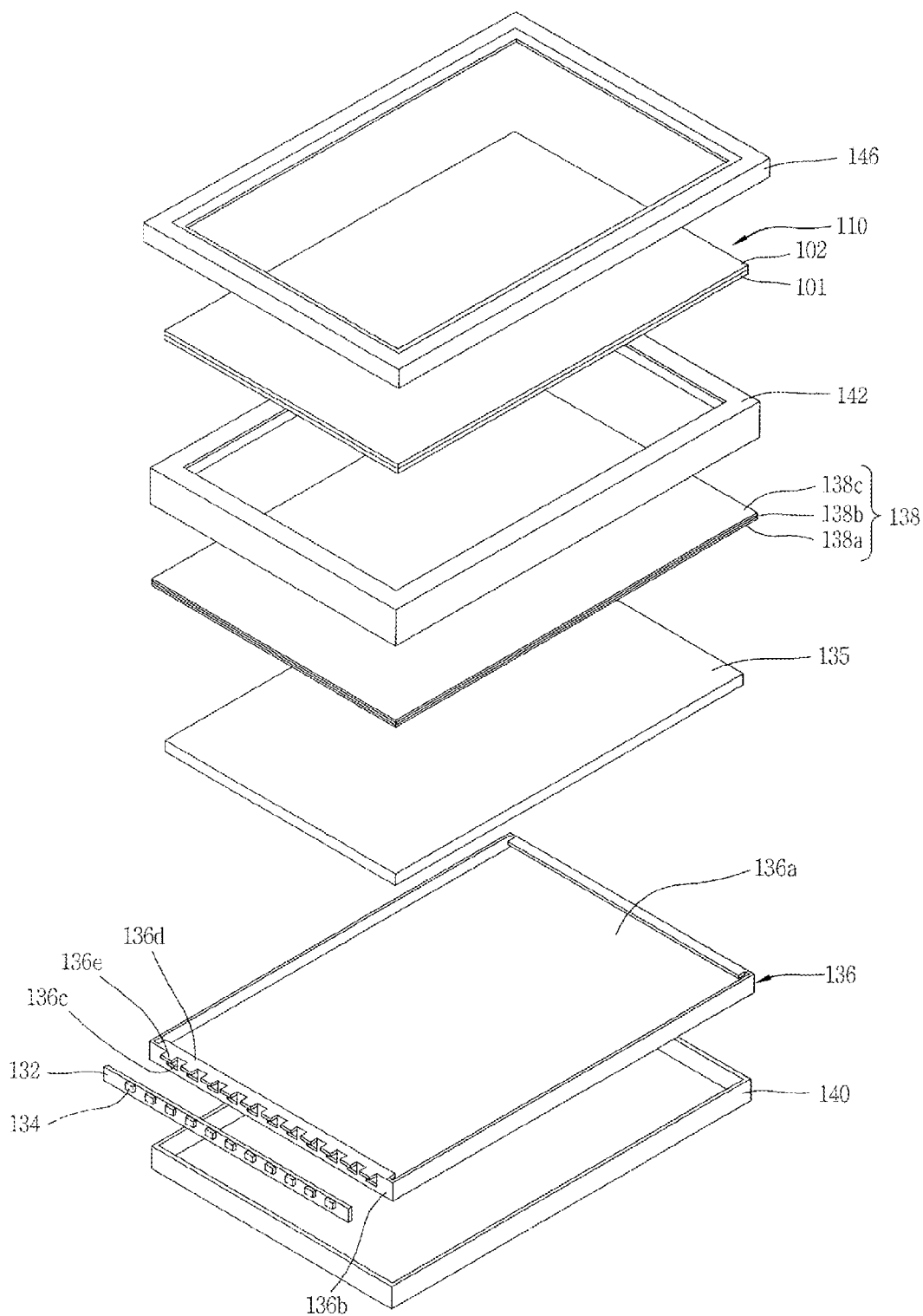
FIG. 4 is a disassembled perspective view of an LCD device according to the present invention.

FIG. 4 is a disassembled perspective view of an LCD device according to the present invention.

As shown in FIG. 4, the LCD device according to the present invention comprises an LC panel 110 and a backlight. The LC panel 110 consists of a first substrate 101, a second substrate 102, and an LC layer (not shown) disposed therebetween. As a signal is applied to the LC panel 110 from outside, an image is implemented.

The backlight includes a light emitting device (LED) substrate 132 disposed at a lower side surface of the LC panel 110 and having a plurality of LEDs 134 for emitting light; a light guide panel 135 disposed below the LC panel 110, for guiding light emitted from the LEDs 134 to the LC panel 110; an optical sheet 138 disposed between the LC panel 110 and the light guide panel 135, and consisting of a diffusion sheet 138a and prism sheets 138b, 138c for diffusing and collecting light supplied from the light guide panel 135 to the LC panel 110; and a reflecting plate 136 disposed below the light guide panel 135, for reflecting incident light to a lower side of the light guide panel 135.

The reflecting plate 136, the light guide panel 135, the optical sheet 138, and the LED substrate 132 of the backlight are accommodated in the bottom cover 140, and are assembled to one another as the bottom cover 140 is coupled to a guide panel 142.

The LC panel 110 is positioned on the guide panel 142. The guide panel 142 is formed in a rectangular shape, and edges of the LC panel 110 are positioned on the guide panel 142.

An top cover 146 is positioned on an upper edge region of the LC panel 110. As the top cover 146 is assembled to the bottom cover 140 and the guide panel 142, the LC panel 110 and the backlight are assembled with each other to complete the LCD device.

Although not shown, a plurality of gate lines and data lines are arranged on the first substrate 101 in horizontal and vertical directions to define a plurality of pixel regions. A thin film transistor (TFT), a switching device is formed at each pixel region, and a pixel electrode is formed on each pixel region. The TFT consists of a gate electrode connected to a gate line, a semiconductor layer formed as an amorphous silicon layer is deposited on the gate electrode, and source and drain electrodes formed on the semiconductor layer and connected to a data line and a pixel electrode, respectively.

The second substrate 102 consists of a color filter composed of a plurality of sub-color filters which implement R, G and B color, and a black matrix for dividing the sub-color filters from one another and shielding light which passes through the LC layer.

The first substrate 101 and the second substrate 102 are bonded to each other so as to face each other by a sealant (not shown) formed at the periphery of an image display region, thereby constituting the LC panel. Here, the first and second substrates 101, 102 are bonded to each other by bonding keys (not shown) of the first substrate 101 or the second substrate 102.

Although not shown, first and second polarizers are attached to the first and second substrates 101, 102, respectively to polarize light incident into or emitted from the LC panel 110, thereby implementing an image.

The light guide panel 135 serves to guide light emitted from the LEDs 134 to the LC panel 110. Light incident into one side surface of the light guide panel 135 is reflected from upper and lower surfaces of the light guide panel 135 to propagate to another side surface of the light guide panel 135. Then, the light is outputted to outside of the light guide panel 135. Here, the light guide panel 135 is formed in a rectangular parallelepiped. And, patterns, grooves, etc. for diffusing incident light may be formed on a lower surface of the light guide panel 135.

The optical sheet 138 enhances efficiency of light emitted from the light guide panel 135, and then supplies the light to the LC panel 110. The optical sheet 138 consists of a diffusion sheet 138a for diffusing light outputted from the light guide panel 135, and first and second prism sheets 138b, 138c for collecting the light diffused by the diffusion sheet 138a and uniformly supplying the light to the LC panel 110. Here, the diffusion sheet 138a is formed in one in number, whereas the prism sheet is formed in two in number. The prism sheet includes the first and second prism sheets 138b, 138c that prisms are perpendicularly crossing each other in X and Y axis directions. By the prism sheet, light is refracted in the X and Y axis directions thus to have an enhanced propagation characteristic in a straight line.

As the LEDs 134, may be used R, G and B LEDs for emitting monochromatic light such as red, green and blue light, or LED devices for emitting white light.

In case of using the LEDs for emitting monochromatic light, the LEDs are alternately arranged with a constant interval therebetween, and each monochromatic light emitted from the LEDs is mixed into white light. Then, the white light is supplied to the LC panel 110.

On the other hand, in case of using the LED devices for emitting white light, a plurality of LED devices are arranged with a constant interval therebetween to supply white light to the LC panel 110.

The LED devices for emitting white light consists of a blue LED for emitting blue light, and a fluorescent body for emitting yellow light by absorbing the blue light. The blue monochromatic light emitted from the blue LED, and the yellow monochromatic light emitted from the fluorescent body are mixed with each other, thereby being supplied to the LC panel 110 as white light. In drawings, the LEDs 134 are arranged at one side surface of the light guide panel 135. However, the LEDs 134 may be arranged at both side surfaces of the light guide panel 135.

The LEDs 134 are mounted on the LED substrate 132 formed of a metallic or flexible film. The LED substrate 132 is arranged along a side surface of the light guide panel 135 to face the side surface of the light guide panel 135. Light emitted from the LEDs 134 is made to be incident onto the light guide panel 135 through the side surface of the light guide panel 135. In drawings, the LED substrate 132 is arranged at one side surface of the light guide panel 135. However, the LED substrate 132 may be arranged at both side surfaces of the light guide panel 135, so that light can be made to be incident onto the light guide panel 135 through said both side surfaces of the light guide panel 135.

Although not shown, the LED substrate 132 is connected to an external driving circuit, so that an external signal and power are supplied to an LED controller. The LED controller drives the LEDs 134 according to the supplied signal. A flexible circuit board (FCB) (not shown) is attached to the LED substrate 132, and is connected to the external driving unit. Signal wires are formed on an upper surface or a lower surface of the FCB, through which a signal from the driving circuit is inputted to the LED substrate 132.

The bottom cover 140 consists of wall surfaces for fixing a bottom surface of the reflecting plate 136, side surfaces of the light guide panel 135, and a rear surface of the LED substrate 132. As the bottom cover 140 accommodates therein the reflecting plate 136, the light guide panel 135, the optical sheet 138, the LEDs 134, etc., the backlight is assembled. An external driving device is provided outside the bottom cover 140 to apply a signal to the LC panel 110 and the LEDs 134.

The guide panel 142 is coupled to the bottom cover 140 so that an upper surface thereof can encompass edges of the optical sheet 138 and side surfaces of the bottom cover 140. The LC panel 110 is mounted on an upper surface of the guide panel 142. As the top cover 146 covers a peripheral region of the LC panel 110, the LC panel 110 and the backlight are assembled to each other.

The reflecting plate 136 is extending not only to a lower surface of the light guide panel 135, but also to upper and side surfaces of the light guide panel 135. That is, the side surface of the reflecting plate 136 where the LEDs 134 are arranged has regions removed therefrom in correspondence to the LEDs 134, thereby implementing windows. The LEDs 134 are arranged at the windows of the reflecting plate 136.

The reflecting plate is made of a material selected from a group consisting of polycarbonate, polymethyl methacrylate, and polyethylene terephthalate.

Figure 5:
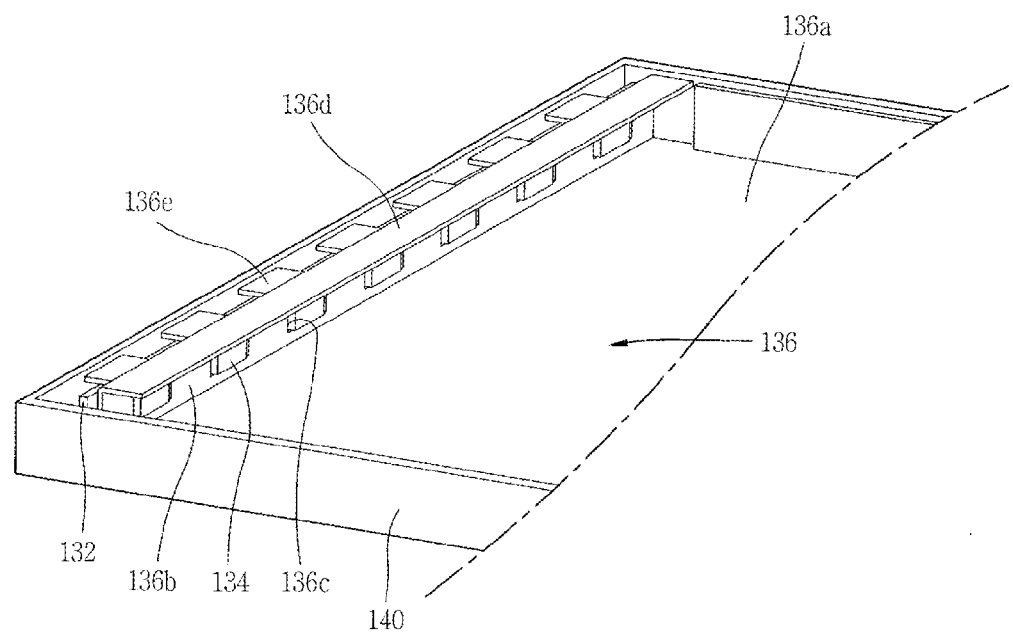
FIG. 5 is a perspective view showing a structure of a reflecting plate of the LCD device according to the present invention.

A reflecting plate 136 disposed below the light guide panel 135. FIG. 5 is a perspective view showing a structure of the reflecting plate 136 of the LCD device according to the present invention.

In order to more clearly disclose a structure of the reflecting plate 136, FIG. 5 shows that the reflecting plate 136 is disposed on the bottom cover 140, and the LED substrate 132 is disposed on a side surface of the bottom cover 140.

Referring to FIG. 5, the reflecting plate 136 includes a body 136a disposed on the bottom cover 140, for reflecting light emitted from a bottom surface of the light guide panel 135 thereby making the light incident onto the light guide panel 135 through the bottom surface of the light guide panel 135; four side surfaces 136b upwardly extending from four edges of the body 136a and facing four side surfaces of the light guide panel 135, for reflecting incident light thereby making the light re-incident into the side surfaces of the light guide panel 135; a plurality of windows 136c formed on one of the four side surfaces, said one surface where the LED substrate 132 is arranged; a first extension portion 136e extended from the side surface 136b where the windows 136c are formed, and disposed on an opposite side to the light guide panel 135, i.e., a side of the LED substrate 132. such that the first extension portion 136e is arranged at corresponding to the windows 136c; a second extension portion 136d extended from the side surface 136b the windows 136c are formed and disposed on the light guide panel 135.

The four side surfaces 136b extending from the body 136a of the reflecting plate 136 include to be separated from each other so as to be bent with respect to the body 136a. However, the four side surfaces 136b may be integrated with each other, or may be separated from each other with a constant interval therebetween.

The side surfaces 136b face side surfaces of the light guide panel 135, and reflect light emitted from the side surfaces of the light guide panel 135 to make the light incident into the side surfaces of the light guide panel 135, thereby enhancing optical efficiency. In drawings, the second extension portion 136d is formed at one of the four side surfaces 136b, said one surface where the LED substrate 132 is arranged. However, the second extension portion 136d may be formed at all of the four side surfaces 136b, so that light emitted from the side surfaces of the light guide panel 135 can be totally reflected into the light guide panel 135 by the side surfaces 136b.

The LED substrate 132 is arranged on a rear surface of the side surface 136b of the reflecting plate 136. That is, the LED substrate 132 is disposed between a wall surface of the bottom cover 140 and the side surface 136b of the reflecting plate 136. As shown in FIG. 5, a plurality of windows 136c are formed at the side surface 136b of the reflecting plate 136, on a front surface of the LED substrate 132. Through these windows 136c, the LEDs 134 mounted on the LED substrate 132 directly face the side surface of the light guide panel 135. More concretely, the LEDs 134 are encompasses by the body 136a, the side surface 136b having the windows 136c, and the second extension portion 136d of the reflecting plate 136, i.e., only an exit of the LEDs 135 is open towards the side surface of the light guide panel 135. The body 136a, the side surface 136b having the windows 136c, and the second extension portion 136d encompass the LEDs 134 like a lamp housing, so that light emitted from the LEDs 134 is made to be completely incident into the side surface of the light guide panel 135.

Figure 6:
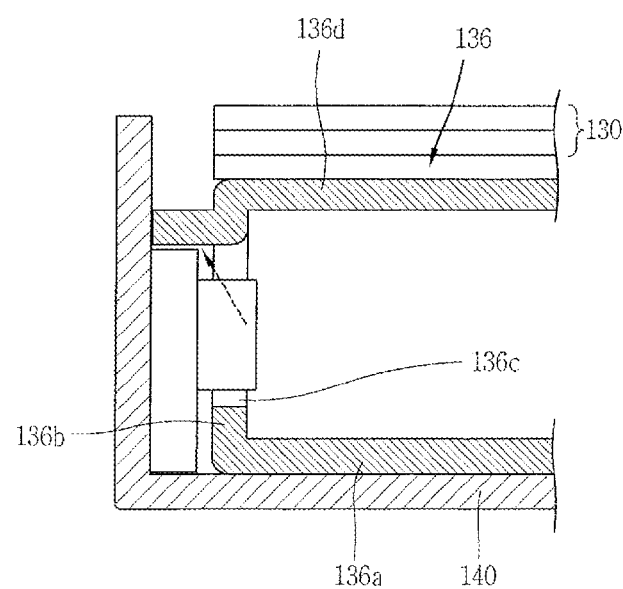
FIG. 6 is a partial enlargement sectional view of a reflecting plate of the LCD device according to the present invention.

Referring to FIG. 6, the first extension portion 136e and the second extension portion 136d is extending from an upper end of the side surface 136b having the windows 136c, and the first extension portion 136e is extending towards the LED substrate 132 at an opposite side to the second extension portion 136d. Referring to FIG. 5, the second extension portion 136d is consecutively formed from one side to another side of the side surface of the light guide panel 135, i.e., through the entire part of one side surface 136b, whereas the first extension portion 136e is formed only at regions corresponding to the windows 136c.

The first extension portion 136e may be formed by additionally attaching a reflective material to an upper part of the side surface 136b of the reflecting plate 136, or may be formed by cutting a part of the side surface 136b and upwardly bending the cut part when forming the windows 136c. Here, the cutting part may be the entire part of the side surface 136b, i.e., a part adjacent to the second extension portion 136d. Alternatively, the cutting part may not include a part adjacent to the second extension portion 136d, so as to be easily bent towards an upper side.

The second extension portion 136d of the reflecting plate 136 is extending towards a portion of the upper surface of the light guide panel 135, and the first extension portion 136e is extending from an upper part of the windows 136c towards the opposite side of the light guide panel 135, i.e., towards the LED substrate 132. Accordingly, as shown in FIG. 6, light emitted from the LEDs 134 and leaking to a space between the LED substrate 132 arranged at corresponding to the windows 136c and the side surface 136b of the reflecting plate 136 is reflected by the first extension portion 136e. As a result, light leakage to the outside does not occur.

Figure 7:
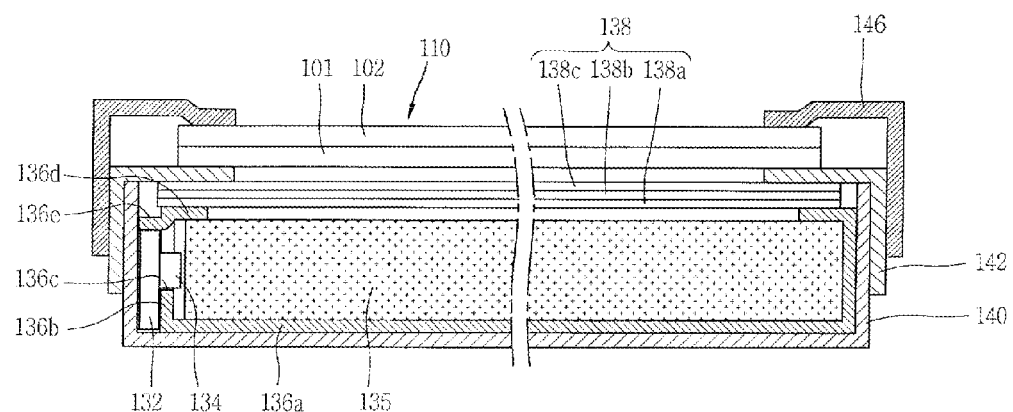
FIG. 7 is a sectional view of the LCD device according to the present invention.

FIG. 7 is a sectional view showing a structure of the LCD device in which the backlight including the reflecting plate 136 having the first and second extension portions 136e, 136d is assembled with the LC panel 110.

As shown in FIG. 7, the light guide panel 135 is arranged in the bottom cover 140, and the reflecting plate 136 is arranged between the bottom cover 140 and the light guide panel 135. On a side surface of the light guide panel 135, installed is the LED substrate 132 having the plurality of LEDs 134 arranged along the side surface of the light guide panel 135. Here, the side surface 136b of the reflecting plate 136 is arranged on a front surface of the LED substrate 132, and the bottom cover 140 is positioned on a rear surface of the LED substrate 132. The LEDs 134 of the LED substrate 132 face the side surface 136b of the light guide panel 135 through the windows 136c of the reflecting plate 136, so that light emitted from the LEDs 134 is made to be incident onto the side surface of the light guide panel 135.

The second extension portion 136d of the reflecting plate 136 is bent towards the light guide panel 135, thus to be extending to an edge region of an upper surface of the light guide panel 135. And, the first extension portion 136e is bent at an opposite side to the second extension portion 136d, thus to be extending towards an upper part of the LED substrate 132. Here, the first extension portion 136e is formed above the windows 136c, thereby shielding light leaked to the windows 136c.

On the light guide panel 135, arranged is the optical sheet 138 comprising of one diffusion sheet 138a and two prism sheets 138b, 138c. The optical sheet 138 diffuses light emitted from the light guide panel 135 and collects the light, thereby enhancing a propagation characteristic of light in a straight line.

The guide panel 142 is disposed on an edge region of the optical sheet 138. The guide panel 142 is formed in a shape to cover the edge of the optical sheet 138 and the bottom cover 140. And, the LC panel 110 is positioned on the guide panel 142 disposed on the edge of the optical sheet 138.

The top cover 146 is disposed on an edge region of the LC panel 110. As the top cover 146 is coupled to the guide panel 142 and the bottom cover 140 by various methods such as screw coupling, the LCD device is assembled.

As a signal is applied from the external driving circuit to the LEDs 134 of the assembled LCD device, light is emitted from the LEDs 134 thus to be incident onto the side surface of the light guide panel 135. At the same time, light leaking to the windows 136c, etc. of the reflecting plate 136 is again reflected to the light guide panel 135 by the first extension portion 136e of the reflecting plate 136.

The light incident onto the light guide panel 135 propagates in the light guide panel 135, and then is supplied to the LC panel 110 via the optical sheet 138. The optical sheet 138 diffuses and collects the light incident onto the light guide panel 135, thereby uniformly supplying light having an enhanced propagation characteristic in a straight line to the LC panel 110.

As scan signals are applied to the gate lines inside the LC panel 110 from the external driving circuit, the TFTs are driven. At the same time, as data signals are applied to the data lines from the external driving circuit, transmittance of light passing through the LC panel 110 is controlled to implement an image.

As aforementioned, in the present invention, the extension portion extending towards the LED substrate is formed at a region of the reflecting plate corresponding to the windows. Accordingly, light emitted from the LEDs is prevented from leaking to a space between the reflecting plate and the LED substrate. This may prevent inferiority of an image quality on the LC panel of the LCD device.

In the present invention, the second extension portion is formed by bending the reflecting plate to be cut so as to form the windows. However, the second extension portion may be formed by attaching an additional reflecting plate to a corresponding region. In this case, the second extension portion is not arranged at the reflecting plate corresponding to the windows, but may be formed along the entire part of the reflecting plate contacting the LEDs.

Furthermore, in the present invention, the LED substrate is arranged only at one side of the light guide panel. However, the LED substrate may be arranged at both side surfaces or at least three side surfaces of the light guide panel, such that light is made to be incident into the light guide panel through the two or at least three side surfaces of the light guide panel. In this case, the first and second extension portions have to be formed on the entire part of the reflecting plate where the LED substrate is arranged.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A reflecting plate of a backlight having light emitting devices (LEDs) and a light guide panel, the reflecting plate comprising:
    a body disposed below the light guide panel, for reflecting light emitted from the light guide panel;
    side surfaces upwardly extending from four edges of the body;
    a plurality of windows formed on at least one of the side surfaces where the LEDs are arranged; and
    a first extension portion disposed on an upper end of the at least one of the side surfaces where the LEDs are arranged, and extending towards the LEDs, the first extension portion being disposed above the LEDs and configured to reflect light to the upper portion of the LEDs.

2. The reflecting plate of claim 1, further comprising a second extension portion formed on the upper end of the side surface where the LEDs are arranged, and extending towards the light guide panel to be positioned on an upper surface of the light guide panel.

3. The reflecting plate of claim 1, wherein the first extension portion is formed above the windows formed on the at least one of the side surfaces.

4. The reflecting plate of claim 3, wherein the first extension portion is formed by upwardly bending the at least one of the side surfaces to be cut so as to form the windows.

5. A backlight for a liquid crystal display (LCD) device, comprising:
    a light emitting device (LED) substrate having thereon a plurality of LEDs for supplying light to a liquid crystal (LC) panel;
    a light guide panel for guiding light emitted from the LEDs to the LC panel; and
    a reflecting plate disposed on a bottom surface or side surfaces of the light guide panel, for reflecting light outputted from the light guide panel,
    wherein the reflecting plate comprises:
        a body disposed below the light guide panel, for reflecting light emitted from the light guide panel,
        side surfaces upwardly extending from four edges of the body,
        a plurality of windows formed on at least one of the side surfaces where LEDs are arranged, and
        a first extension portion disposed on an upper end of the at least one of the side surfaces where the LEDs are arranged, and extending towards the LEDs, the first extension portion being disposed above the LEDs and configured to reflect light to the upper portion of the LEDs.

6. The backlight of claim 5, further comprising:
    a diffusion sheet disposed above the light guide panel, for diffusing light emitted from the light guide panel; and
    first and second prism sheets for collecting the light diffused by the diffusion sheet and enhancing a propagation characteristic of the light in a straight line.

7. A liquid crystal display (LCD) device, comprising:
an LC panel;
a light emitting device (LED) substrate formed on one or more sides below the LC panel, and having a plurality of LEDs mounted thereon, the LEDs for supplying light to the LC panel;
a light guide panel for guiding light emitted from the LEDs to the LC panel; and
a reflecting plate disposed on a bottom surface or side surfaces of the light guide panel, for reflecting light outputted from the light guide panel,
wherein the reflecting plate comprises:
- a body disposed below the light guide panel, for reflecting light emitted from the light guide panel,
- side surfaces upwardly extending from four edges of the body,
- a plurality of windows formed on at least one of the side surfaces where LEDs are arranged, and
- a first extension portion disposed on an upper end of the at least one of the side surfaces where the LEDs are arranged, and extending towards LEDs, the first extension portion being disposed above the LEDs and configured to reflect light to the upper portion of the LEDs.

8. The LCD device of claim 7, further comprising:
an optical sheet disposed above the light guide panel, for enhancing efficiency of light supplied to the LC panel;
a bottom cover and a guide panel, for coupling the light guide panel and the LED substrate to each other; and
a top cover encompassing an upper edge of the LC panel, and coupled to the bottom cover and the guide panel, for coupling the LC panel, the light guide panel, and the LED substrate to one another.

9. The LCD device of claim 7, wherein the reflecting plate is made of a material selected from a group consisting of polycarbonate, polymethyl methacrylate, and polyethylene terephthalate.

* * * * *